United States Patent [19]
Hirota

[11] Patent Number: 5,390,396
[45] Date of Patent: Feb. 21, 1995

[54] END STOPS OF SYNTHETIC RESIN FOR SLIDE FASTENER

[75] Inventor: Minoru Hirota, Toyama, Japan

[73] Assignee: Yoshida Kogyo K.K., Tokyo, Japan

[21] Appl. No.: 136,874

[22] Filed: Oct. 18, 1993

[30] Foreign Application Priority Data

Oct. 19, 1992 [JP] Japan .............................. 4-082966[U]

[51] Int. Cl.6 ................................................ A44B 19/00
[52] U.S. Cl. ........................................ 24/436; 24/433
[58] Field of Search .............. 24/436, 433, 447, 90 HA

[56] References Cited

U.S. PATENT DOCUMENTS

| | | | |
|---|---|---|---|
| 3,462,803 | 8/1969 | Horton | 24/90 HA |
| 3,672,008 | 6/1972 | Moertel et al. | 24/436 |
| 3,715,781 | 2/1973 | Salvatori | 24/90 HA |
| 4,331,493 | 5/1982 | Lawrence | |
| 4,457,051 | 7/1984 | Bartolini | 24/90 HA |
| 4,662,033 | 5/1987 | Wieland, Jr. et al. | 24/90 HA |

FOREIGN PATENT DOCUMENTS

| | | | |
|---|---|---|---|
| 0454144 | 10/1991 | European Pat. Off. | |
| 2450076 | 9/1980 | France | |
| 2414312 | 10/1975 | Germany | 24/90 HA |
| 0059136 | 12/1985 | Japan | 24/436 |
| 2046829 | 11/1980 | United Kingdom | |

Primary Examiner—Victor N. Sakran
Attorney, Agent, or Firm—Hill, Steadman & Simpson

[57] ABSTRACT

An end stop of synthetic resin having a pair of groove portions clamping and fused to an attachment core of at least one of a pair of fastener tapes, wherein each of the groove portions has at least one projection fusible to the attachment core and directed radially inwardly and situated remotely from opposite ends of each groove portion.

6 Claims, 3 Drawing Sheets

END STOPS OF SYNTHETIC RESIN FOR SLIDE FASTENER

BACKGROUND OF THE INVENTION

1. Field of the Invention

This invention relates to synthetic resin end stops for a slide fastener, and more particularly to a structure in which end stops are fused and attached to at least one of opposite fastener tapes.

2. Description of the Related Art

In the production of conventional slide fasteners, end stops of synthetic resin were mounted directly on an edge of at least one of opposite fastener tapes by injection molding, or end stops were formed of synthetic resin and then the synthetic resin end stops were attached to the fastener tape edge or edges by fusing. In the latter case, as disclosed in, for example, Japanese Patent Laid-Open Publication No. HEI 4-8303, a top stop composed of a pair of opposite leg portions connected by a central thin bridge portion, each leg portion having a groove portion for receiving a part of the core of the respective fastener tape is folded about the bridge portion to clamp the core of the fastener tape edge by the groove portions of the opposite leg portions, whereupon synthetic resin at contacts between the groove portions and the core of the fastener tape edge is fused by heating under pressure using an ultrasonic heater.

In the last-named conventional art, since the whole of the previously formed synthetic resin end stop must be heated under pressure for fusing, the end stop tends to vary in thickness and hence would be not stable in size. Further, since relatively large pressure is exerted on the core, the fastener tape would be easily deteriorated. Moreover, since melted synthetic resin leaks from the joint of the folded end stop halves to form fins, it would make the appearance of the end stop unsightly but also would catch underwear or an other garment in use as well as would influence on movement of a slider.

SUMMARY OF THE INVENTION

It is an object of this invention to provide a synthetic resin end stop, for a slide fastener, which is free of change in size during attaching to the fastener tape and free of deterioration of the core of the fastener tape edge as well as free from any leakage of synthetic resin from the joint of the end stop.

According to this invention, there is provided an end stop of synthetic resin having a pair of groove portions clamping and fused to an attachment core of at least one of a pair of fastener tapes, wherein each of the groove portions has at least one projection fusible to the attachment core and directed radially inwardly and situated remotely from opposite ends of each groove portion.

DETAILED DESCRIPTION

Embodiments of this invention will now be described with reference to the accompanying drawings.

Figure 1:
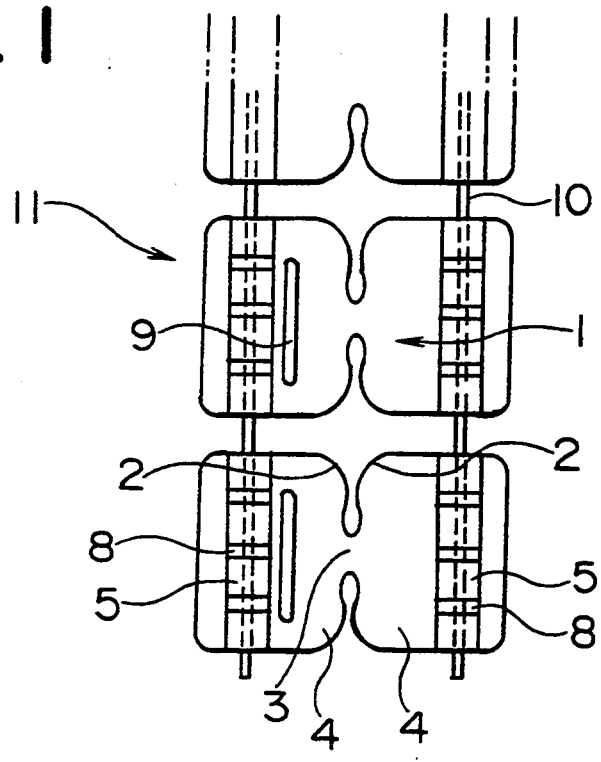
FIG. 1 is a plan view showing a top stop strip including a succession of connected top stops according to a first embodiment of this invention.

FIG. 1 shows a top stop strip 11 including a succession of prospective top stop 1 connected by connecting threads 10. A single top stop 1 is taken from the top stop strip 11 by cutting the connecting threads 10 and is then attached to a fastener tape 6.

Figure 2:
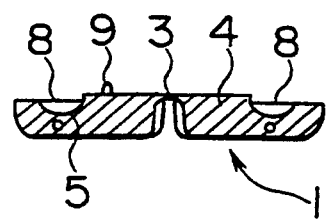
FIG. 2 is a cross-sectional view of the top stop of the first embodiment.
Figure 3:
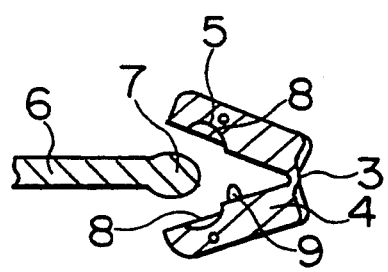
FIG. 3 is a cross-sectional view showing the manner in which the top stop is attached to a fastener tape.

In production, the prospective top stop 1, which is made of synthetic resin, is folded centrally on itself to clamp the fastener tape 6, whereupon the top stop 1 is attached to the fastener tape 1 by fusing by a heating and pressurizing means. In order to perform smooth and accurate folding, the top stop 1 has a pair of cutouts 2, 2 to define centrally a small-thickness bridge portion 3 as shown in FIG. 2. The top stop 1 is composed of prospective [front and rear] leg portions 4, 4 which are connected by the central bridge portion 3 for clamping one edge of the fastener tape 6 when the top stop 1 is folded. Each leg portion 4 has, in one end remote from the central bridge portion 3, a groove portion 5 which extends longitudinally of the top stop strip 1 for receiving a part of an attachment core 7 of the edge of the fastener tape 6 when the top stop 1 is folded. The groove portion 5 has three fusible projections 8 spaced at predetermined distances axially and directed radially inwardly, each having a semicircular or a segment-of-circle shape with a flat upper surface, as shown in FIG. 2. The fusible projections 8 are formed of the same kind of synthetic resin as that of the top stop 1 so that they will be fused to the attachment core 7 when the [front and rear] leg portions 4, 4 are heated under pressure with the attachment core 7 of the fastener tape 6 fitted in the opposite groove portions 5 as the leg portions 4, 4 are folded on itself about the bridge portion 3, as shown in FIG. 3. The individual projection 8 has a relatively small thickness so that it will melt in a short time with small pressure before the leg portion 4 of the top stop 1 will undergo deformation as heated under pressure. The outer projections 8 are situated away from the ends of the groove portion 5 so that molten synthetic resin will not leak from the groove portion 5 and hence will not form any fin.

One of the leg portions 4 has a linear fusing projection 9 situated between the groove portion 5 and the central bridge portion 3 and extending parallel to the groove portion 5. This projection 9 is fusible to the other leg portion 4 when the opposite leg portions 4, 4 as folded are heated under pressure. The projection 9, like the projections 8, has a suitable width and a suitable height such that it will melt in a short time with small pressure before the leg portion 4 will undergo deformation as heated under pressure.

The number and width of the fusible projections 8 may be selected suitably to meet the degree of welding which depends on, for example, the size of the core 7 of the fastener tape 6. Also the projection 9 may be a curved or dotted form instead of the linear form as illustrated, and it may be more than one to meet with the degree of welding and the size of the leg portion.

Preferably, the projections 8 should extend perpendicularly to the core 7 so that the top stop will hardly be removed from the core 7 when a slider is pulled up all the way to bump against the top stop.

Figure 4:
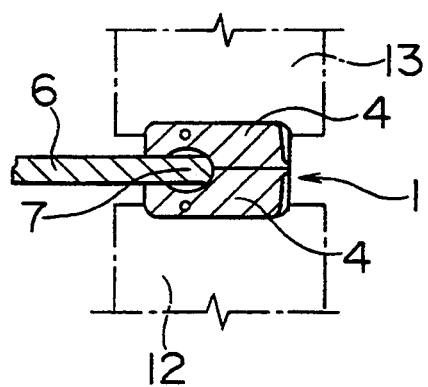
FIG. 4 is a cross-sectional view showing the manner in which the top stop is heated under pressure.
Figure 5:
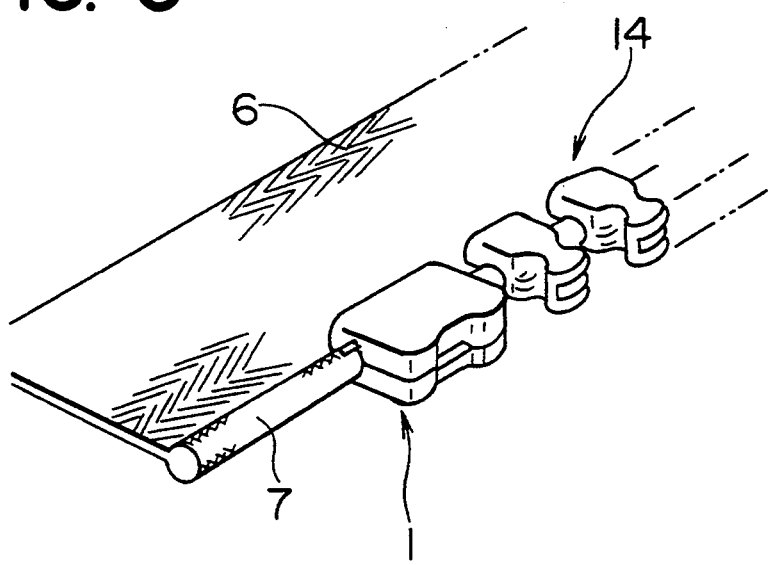
FIG. 5 is a perspective view showing the top stop attached to the fastener tape.

FIG. 4 shows the manner in which the top stop 1 folded to sandwich the core 7 of the fastener tape 6 between the opposite groove portions 5 is heated under pressure while it is held between an anvil 12 and an ultrasonic oscillator horn 13. Partly since the core 7 is joined with the opposite groove portions 5, 5 as the projections 8 are fused, and partly since the opposite leg portions 4, 4 are joined together as the projection 9 is fused, the top stop 1 is attached to the edge of the fastener tape 6 at the upper end of a coupling element row 14.

Figure 6:
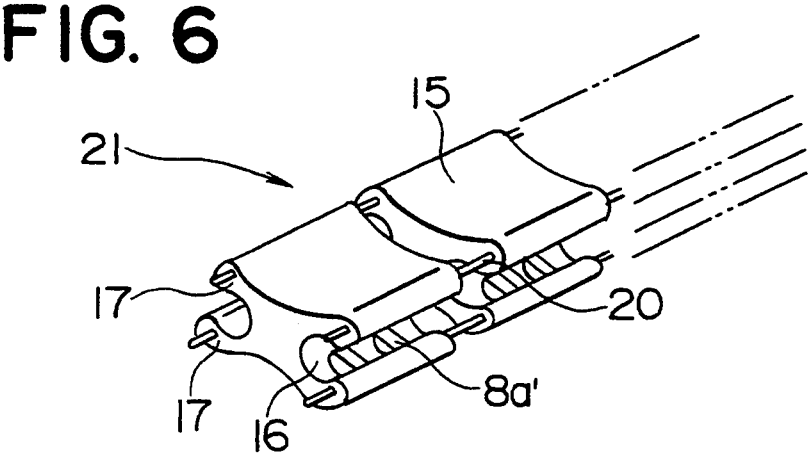
FIG. 6 is a perspective view showing a bottom stop strip including a succession of connected bottom stops according to a second embodiment of the invention.

FIG. 6 shows a bottom stop strip 21 including a succession of prospective bottom stops 15 connected by connecting threads 20. The individual bottom stop 15 has in opposite side surfaces a pair of tubular groove portions 16, 16 each opening laterally outwardly.

Figure 7:
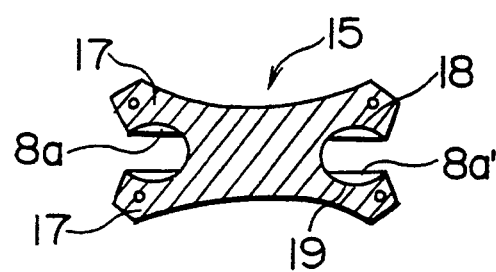
FIG. 7 is a cross-sectional view showing the bottom stop of the second embodiment.
Figure 8:
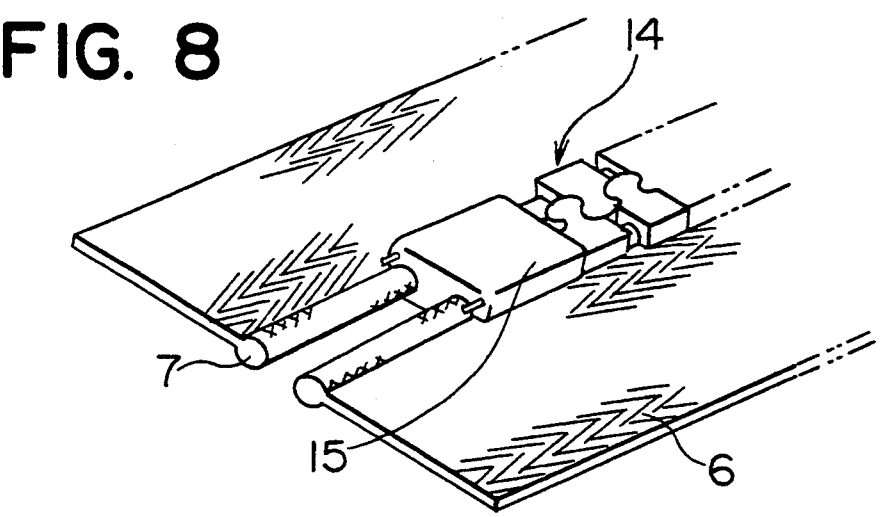
FIG. 8 is a perspective view showing the bottom stop attached to the fastener tapes.

In production, the core 7 of the edge of each fastener tape 6 is inserted between upper and lower leg portions 17, 17 defining the respective groove portion 16 on each side of the bottom stop 1, whereupon the upper and lower leg portions 17, 17 are heated under pressure, thus attaching the bottom stop 15 to the fastener tape 6. Each tubular groove portion 16, likewise the groove portion 5 of the top stop 1, has a pair of upper spaced fusible projections 8a and a pair of lower spaced fusible projections 8a' on an upper concave surface 18 and a lower concave surface 19, respectively, each projection 8a, 8a' having a semi-circular or segment-of-circle shape, as shown in FIG. 7. The projections 8a, 8a' will be fused to the core 7 when the upper and lower leg portions 17, 17 are heated under pressure. FIG. 8 shows the manner in which the bottom stop 15 is attached to the opposite fastener tapes 6, 6 at the lower end of a coupling element row 14 on each side. The individual projection 8a, 8a' like the projection 8 of the top stop 1, has a relatively small thickness so that it will melt in a short time with small pressure before leg portions of the bottom stop 15 will undergo deformation as heated under pressure. The projections 8a are situated away from the ends of the groove portion 16 so that molten synthetic resin will not leak from the associated groove portion 5 and hence will not form any fin. The number and width of the fusible projections 8a, 8a' may be selected suitably in accordance with the degree of welding which depends on, for example, the size of the core 7 of the fastener tape 6.

With the foregoing arrangement, since the groove portion for receiving the core of the fastener tape has fusible projections at positions remote from opposite ends of the groove portion, the projections will be molten before the end stop will undergo deformation as heated under pressure, thus attaching the end stop to the core without impairing the stability size. Further, since the projections will be molten in a short heating time under small pressure, it is possible to prevent the core from being deteriorated. Moreover, since the projections are situated away from opposite ends of the groove portion, molten synthetic resin will not leak from the joint of the end stop and will not form any fin, thus keeping the appearance of the stop tidy and making it free from catching underwear or an other garment in use as well as causing smooth movement of a slider.

What is claimed is:

1. An end stop of synthetic resin including front and rear leg portions each having a groove portion having a groove, said groove portion clamping and fused to an attachment core of at least one of a pair of fastener tapes, wherein each of said groove portions has at least one projection fusible to said attachment core and located in said groove and directed radially inwardly and situated remotely from opposite ends of said groove portion.

2. A synthetic resin end stop according to claim 1, wherein said at least one projection comprises a plurality of fusible projections within said groove spaced at distances longitudinally along said groove portion.

3. A synthetic resin end stop according to claim 2, wherein said projection has a segment-of-circle shape as viewed axially of said groove portion.

4. A synthetic resin end stop according to claim 1, wherein said projection has a segment-of-circle shape as viewed axially of said groove portion.

5. An end stop of synthetic resin including:

front and rear leg portions each having a groove portion having a groove, said groove portion clamping and fused to an attachment core of at least one of a pair of fastener tapes, wherein each of said groove portions has at least one projection fusible to said attachment core and located in said groove and directed radially inwardly and situated remotely from opposite ends of said groove portion;

wherein said front and rear leg portions are connected together by a bridge portion, and one of said front and rear leg portions of each end stop has a fusing projection situated between said groove portion and said central bridge portion which connects said leg portions.

6. A synthetic resin end stop according to claim 5, wherein said fusing projection is linear.

* * * * *